United States Patent [19]
Fox

[11] Patent Number: 5,875,291
[45] Date of Patent: Feb. 23, 1999

[54] METHOD AND APPARATUS FOR CHECKING TRANSACTIONS IN A COMPUTER SYSTEM

[75] Inventor: Ronnie Eileen Fox, Cupertino, Calif.

[73] Assignee: Tandem Computers Incorporated, Cupertino, Calif.

[21] Appl. No.: 840,138

[22] Filed: Apr. 11, 1997

[51] Int. Cl.[6] .................................................. G06M 11/20
[52] U.S. Cl. ............................ 395/112.13; 315/182.14; 404/200
[58] Field of Search ..................... 395/182.04, 182.11, 395/182.13, 182.14; 707/200, 201, 202

[56] References Cited

U.S. PATENT DOCUMENTS

| | | | |
|---|---|---|---|
| 5,561,794 | 10/1996 | Fortier | 395/726 |
| 5,633,999 | 5/1997 | Clowes et al. | 395/182.04 |
| 5,706,499 | 12/1997 | Kleewein et al. | 707/203 |
| 5,724,581 | 12/1997 | Kozakura | 707/202 |
| 5,748,882 | 5/1998 | Huang | 395/182.13 |

FOREIGN PATENT DOCUMENTS

| | | |
|---|---|---|
| 657 813 A1 | 6/1995 | European Pat. Off. |
| 750 261 A1 | 12/1996 | European Pat. Off. |

*Primary Examiner*—Robert W. Beausoliel, Jr.
*Assistant Examiner*—Pierre Eidy Elisga
*Attorney, Agent, or Firm*—Graham & James LLP

[57] ABSTRACT

A transaction checking system for improving the level of software fault tolerance in a distributed processing environment by aiding the client computer system in the recovery process. The transaction checker system enables the client computer system to determine, after a system failure, the state of the last transaction so that the client computer system can begin the recovery process.

18 Claims, 4 Drawing Sheets

TRANSACTION CHECKER DATABASE

| USER_IDS 400 | WORK_IDs 402 | TIME STAMPS 404 |
|---|---|---|
| User_ID1 406 | Work_ID1 416 | TS1 426 |
| User_ID2 408 | Work_ID2 418 | TS2 428 |
| User_ID3 410 | Work_ID3 420 | TS3 430 |
| User_ID4 412 | Work_ID4 422 | TS4 432 |
| ⋮ | ⋮ | ⋮ |
| User_ID(N) 414 | Work_ID(N) 424 | TS(N) 434 |

FIG. 4

METHOD AND APPARATUS FOR CHECKING TRANSACTIONS IN A COMPUTER SYSTEM

APPENDICES

This application includes Appendix A, which describes the APIs and Host Computer Systems of several implementations of the present invention.

BACKGROUND OF THE INVENTION

This invention relates generally to a method and apparatus for checking the status of transactions on a computer system, and more specifically, to a method and apparatus for providing a client computer system with the status of a current transaction when a connection fails in a distributed processing environment.

The ability of a computer system to respond to a failed connection in a manner that minimizes lost data and the corruption of work in progress is known as a system's "fault tolerance." Generally, failed connections are the result of a power outage or of a hardware failure of some kind. Fault tolerance of a computer system is typically accomplished with a battery-backed power supply, redundant hardware, provisions in the operating system or a combination of these system-saving components.

In a fault-tolerant system, the computer system has the ability either to continue the system's operation without loss of data or to restart the system's operation to recover transactions in progress when the fault occurred. A system failure affecting a network user is generally caused by one or more of three major classes of system failures. The classes are (1) a failure on a client, generally a PC, (2) a failure of the network, and (3) a failure of the host system.

Various methods are employed to recover from a loss of connectivity. For example, a failure of a client PC in a network is generally followed by re-booting the client PC and restarting the client computer system. In contrast, failure of a host is followed by a recovery method suited for the specific cause of the host failure. For example, the host failure could be due to either a failed multi-LAN process, a failed client's message control process or even a total system failure.

Similarly, the recovery method for a network failure will depend upon the specific cause of the failure. For example, a network failure could be due to an outage of the physical medium, network repeater, bridge or router. Each class of system failure described above with regard to either the host or network could be caused by a design or operational error, an equipment outage or from environmental conditions.

Regardless of the class of failure that occurs on the client PC, host system, or network, conventional fault tolerant systems only inform the client of the loss of connectivity. Conventional systems cannot recover the status of the current transaction in progress when the lost connection occurred. When a client computer system restarts or regains connectivity, the client computer system needs to know the status of its current transaction so that it can determine whether or not to re-execute the current transaction. More specifically, the client computer system needs to know whether the current transaction committed before the system failure occurred.

Although conventional fault tolerant systems can recover from a system failure, there remains an unmet need to provide a client computer system with a way to effectively recover from system failure before the client receives notice that a transaction has committed.

SUMMARY OF THE INVENTION

The invention provides for a method and apparatus for performing transaction checking. A described embodiment of the invention provides for a method and apparatus for checking and providing to a client computer system (client) in a distributed processing environment the status of its current transaction in progress when a system failure occurs.

The invention provides a client with the transaction information that the client needs to recover from a system failure. In particular, the invention generally provides application information indicating whether a current transaction committed before a system failure occurred.

A preferred embodiment of the invention provides for a server (Transaction checker) of a host system to perform transaction checking. Clients, (e.g., workstations) communicate through an application program interface (API), to programs on a host system. These programs are generally known as "middleware." On the host system, the middleware communicates with the Transaction checker. When a client requests transaction checking, the middleware invokes the Transaction checker to save and retrieve transaction information. When a loss of connection occurs after the client initiates or terminates a transaction, the invention provides client status information indicating whether its current transaction committed when a system failure occurs. Thus, the Transaction checker allows a client to determine whether or not to re-execute the last transaction.

As described herein, the present invention is a method for a client computer system with state information of a current transaction to aid in a recovery of the client computer system from a system failure, the method comprising the following steps performed by a transaction checker server, of: saving the current transaction to a database including a user ID, a work ID and a time-stamp; maintaining, when the current transaction commits, a user ID, a work ID and a time-stamp, as a last committed transaction; receiving a request to retrieve from the database the last committed transaction of the client computer system identified by the user ID; and returning the work ID of the last committed transaction that corresponds to the user ID.

As further described herein, the present invention is an apparatus for providing a client computer system state information of a current transaction to aid in a recovery of the client computer system from a system failure, the apparatus comprising: a first portion configured to send a request to a middleware application for the transaction checker to perform transaction checking; a second portion configured to receive from the middleware application a user ID uniquely identifying the client computer system; a third portion configured to save the user ID; a fourth portion configured to request a distributed computer processing system to execute the current transaction; a fifth portion configured to create and save a work ID that uniquely identifies the current transaction of the client computer system; a sixth portion configured to send the user ID and the work ID of the current transaction to the transaction checker; a seventh portion configured to send a commit instruction to the middleware application from the client if the client commits the current transaction; an eighth portion configured to send the user ID and a request for the work ID of the last committed transaction to the transaction checker; a ninth portion configured to receive the work ID of the last committed transaction from the transaction checker; and a tenth portion configured to compare the work ID of the current transaction to the work ID of the last committed transaction, wherein if the work ID of the current transaction equals the work ID of the last committed transaction then execution of the current transaction completed successfully, wherein if the work ID of the current transaction does not equal the work ID of the last committed transaction then execution of the current transaction did not commit.

Various advantages of the present invention will become more fully apparent when the following detailed descriptions of the invention are read in conjunction with the accompanying drawings.

BRIEF DESCRIPTION OF THE DRAWINGS

The invention will now be described with reference to the accompanying drawings, wherein:

FIG. 4 shows examples of transactions in a Transaction checker database.

DETAILED DESCRIPTION OF A PREFERRED EMBODIMENT

The following description is of the best presently contemplated mode of carrying out the invention. The description is made for the purpose of illustrating the general principles of the invention and is not to be taken in a limiting sense. The same reference numbers will be used to refer to the same or similar elements shown in the figures.

1. General Discussion

Figure 1:
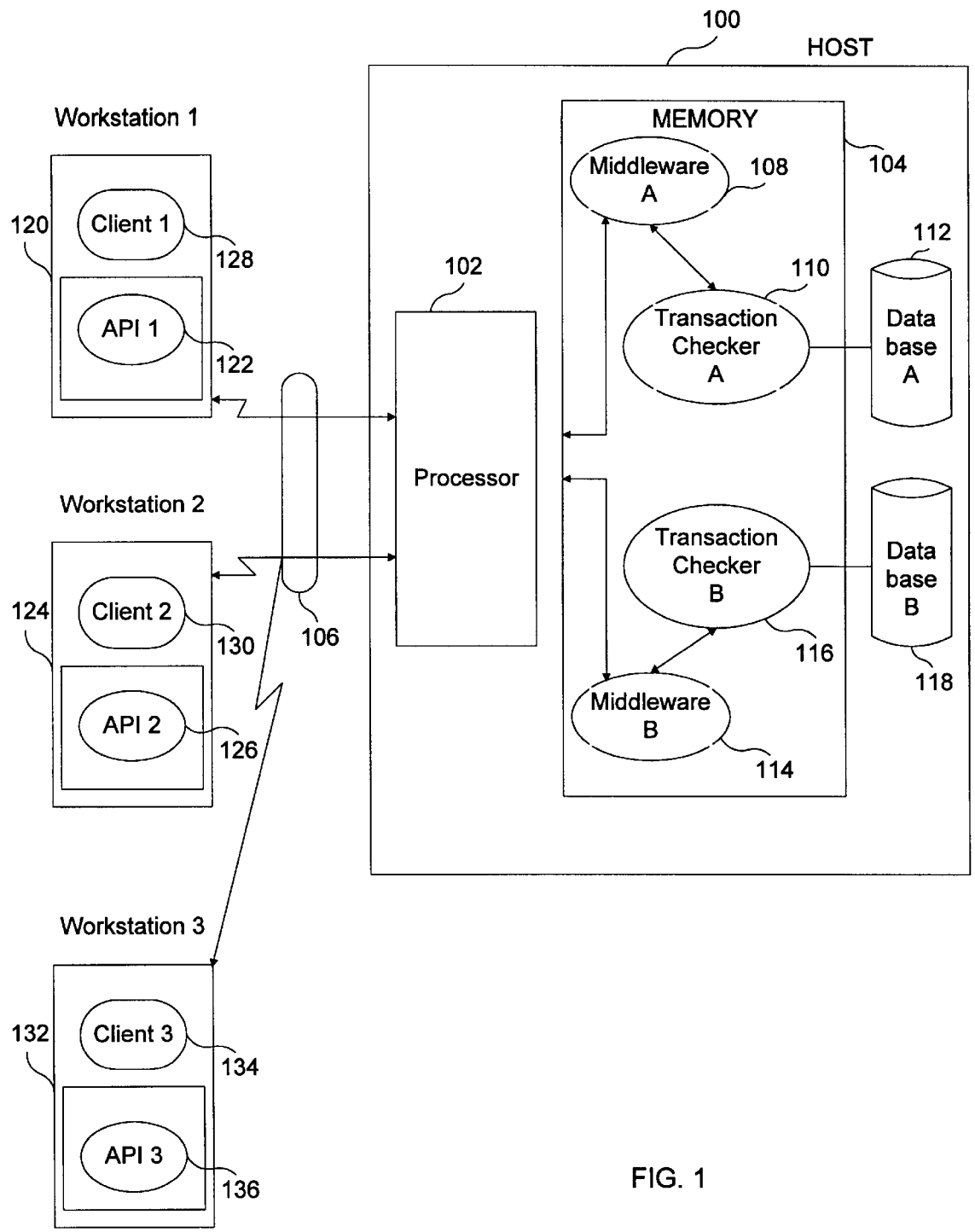
FIG. 1 is a block diagram of a computer system in accordance with a preferred embodiment of the present invention.

FIG. 1 is a block diagram of a distributed computer network in accordance with a preferred embodiment of the present invention. The distributed computer network includes a host computer system 100, client workstation (1) 120, client workstation (2) 124 and client workstation (3) 132. The host computer system 100 includes a processor 102, a memory 104, input/output (I/O) lines 106, a database (A) 112 and a database (B) 118 on disk. It will be understood by a person of ordinary skill in the art that the distributed computer network may include, for example, additional client workstations, host systems and databases. Furthermore, host computer system 100 can also include numerous elements not shown in the figure for the sake of clarity, such as disk drives, keyboards, display devices, network connections, additional memory, additional processors, etc.

Memory 104 includes a middleware program (A) 108, (e.g., Tandem's RSC Transaction Delivery Process (TDP)) and a middleware program (B) 114, (e.g., Tandem's NonStop Tuxedo Work Station Handler (WSH)), a Transaction checker (A) 110 and a Transaction checker (B) 116. In the Figure, the Transaction checker is a server in communication with each specific middleware program. For example, middleware program (A) is in communication with Transaction checker (A), and middleware program (B) is in communication with Transaction checker (B).

Each Transaction checker maintains a unique database of transaction information provided by the corresponding middleware program. For example, middleware program (A) 108 provides Transaction checker (A) 110 with transaction information to store and maintain in a database (A) 112. Similarly, middleware program (B) 114 provides Transaction checker (B) 116 with transaction information to store and maintain in a database (B) 118.

A client resident on a workstation communicates through the work station's API (Application Program Interface) along I/O lines 106 to a corresponding and technically compatible middleware application installed on the host computer 100. Each middleware application may communicate with one or more clients. Each client, API, compatible middleware program and corresponding instance of the Transaction checker application communicate transactions to provide the transaction checking process shown by the distributed processing environment of FIG. 1.

For example, client (1) 128 (e.g., Tandem's RSC) on workstation(1) 120 communicates through API(1) (e.g., Tandem's RSC API) 122 to the middleware program(A) 108 (e.g., Tandem's RSC TDP). Similarly, client(2) 130 (e.g., Tandem's NonStop Tuxedo) on workstation(2) 124 communicates through API(2) 126 (e.g., Tandem's NonStop Tuxedo API), and client (3) 134 (e.g., Tandem's NonStop Tuxedo on workstation (3)) communicates through API(3) 136 (e.g., Tandem's NonStop Tuxedo API) to the middleware program (B) 114 (e.g., Tandem's NonStop Tuxedo Work Station handler (WSH)). These examples showing workstations, APIs and middleware programs are provided merely for purposes of illustrating the transaction checker apparatus and process and, thus, other types of communication interfaces between each component of the distributed processing environment may be used to perform transaction checking.

Figure 2:
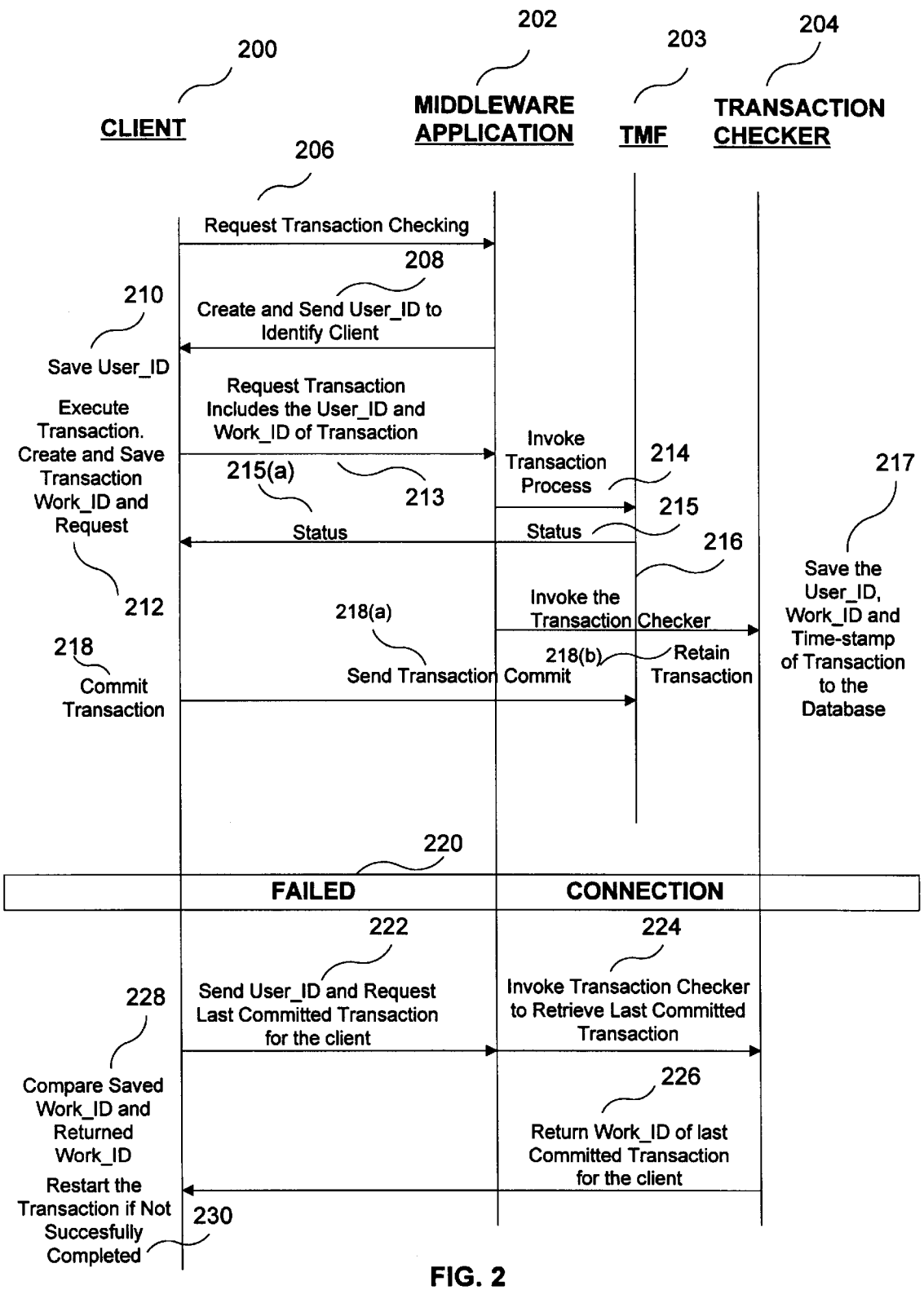
FIG. 2 is a diagram showing a transaction checking method performed by the computer system of FIG. 1.

FIG. 2 is a diagram showing a preferred embodiment of the transaction checking method in accordance with the computer system of FIG. 1. In step 206, the client 200 requests transaction checking. In response to the request, the middleware application 202 in step 208, creates a name (user_ID) to uniquely identify the client 200, and returns the user_ID to the client 200. Depending upon the options provided by the middleware application 202 of the host system, the client 200 may request checking for the current transaction, for all transactions in the current program, or for all transactions in all programs at the installation. In step 210, the client 200 receives and saves the user_ID returned by the middleware application in persistent storage. In step 212, the client 200 sends a request to execute a current transaction, and creates and saves in persistent storage the work_ID of the current transaction. As shown in step 213, the transaction includes requests for one or more transaction functions (add, delete, etc.) and also includes the user_ID and the work_ID of the current transaction. In step 214, the middleware 202 invokes a transaction process, such as Tandem's TMF 203. The transaction process 203 performs transaction functions and returns a status to the middleware application 202 in step 215, that is then sent in step 215(a) to the Client 200.

In step 216, the middleware application 202 invokes the Transaction Checker 204 to enter the transaction object including the user_ID and work_ID, and a time-stamp into its database. In response, the Transaction checker 204, in step 217, saves the user_ID, work_ID and time-stamp to its database. The operations of steps 216 and 217 are included as part of the client's transaction invoked in step 214.

If the functions of the transaction are performed correctly such that the client 200 commits the current transaction in step 218, the client 200 sends a transaction "commit"

instruction in step 218(*a*) to the middleware application 202 to inform the transaction process 203 that the current transaction has committed. In response, the transaction process 203 in step 218(*b*) maintains the current transaction as a last committed transaction.

Sometimes, as shown in step 220, a failed connection occurs before the middleware application 202 can inform the client 200 whether the transaction process 203 committed the current transaction. Generally, the failed connection is due to a power outage or a hardware failure of some kind.

Regardless of the source of the failure, the client 200 needs to know whether the transaction process 203, prior to the failed connection, received the transaction commit instruction from the client 200 and committed the current transaction in progress. If the transaction process 203 received the transaction commit instruction and committed the current transaction prior to the failed connection, then the current transaction will remain in the database as a last committed transaction. However, if the transaction process did not commit the current transaction, then the current transaction upon recovery from the network connection will be deleted from the database.

After recovering from the failure, the client 200, in step 222, sends the user_ID to the middleware application 202 and requests the last committed transaction from the Transaction checker 204. In response, the middleware application 202, invokes Transaction checker 204 to retrieve the work_ID of the last committed transaction for the client. The Transaction checker 204, in step 226, retrieves and returns the work_ID corresponding to the user_ID via the middleware application 202 to the client 200.

In step 228, the client 200 compares the previously saved work_ID of the current transaction to the work_ID of the last committed transaction returned from the Transaction checker 204. If the saved work_ID of the current transaction is equal to the returned work_ID of the last committed transaction, then the current transaction was committed by the transaction process 203 prior to the connection failure. If the saved work_ID of the current transaction is not equal to the returned work_ID of the last committed transaction, then the current transaction had not been committed by the transaction process 203 prior to the connection failure between the client, host system and network. If the transaction did not commit, the client 200, re-requests the current transaction in step 230.

Figure 3A:
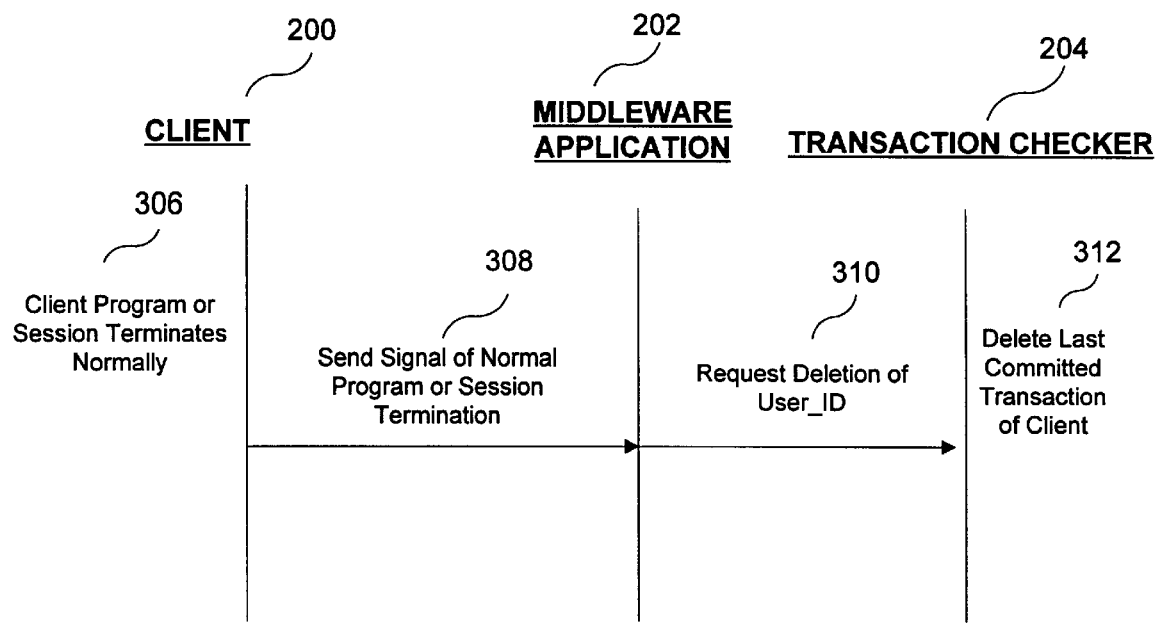
FIG. 3(a) is a diagram showing a method for deleting a last committed transaction of a client in the transaction checker database, as performed by the computer system of FIG. 1.
Figure 3B:
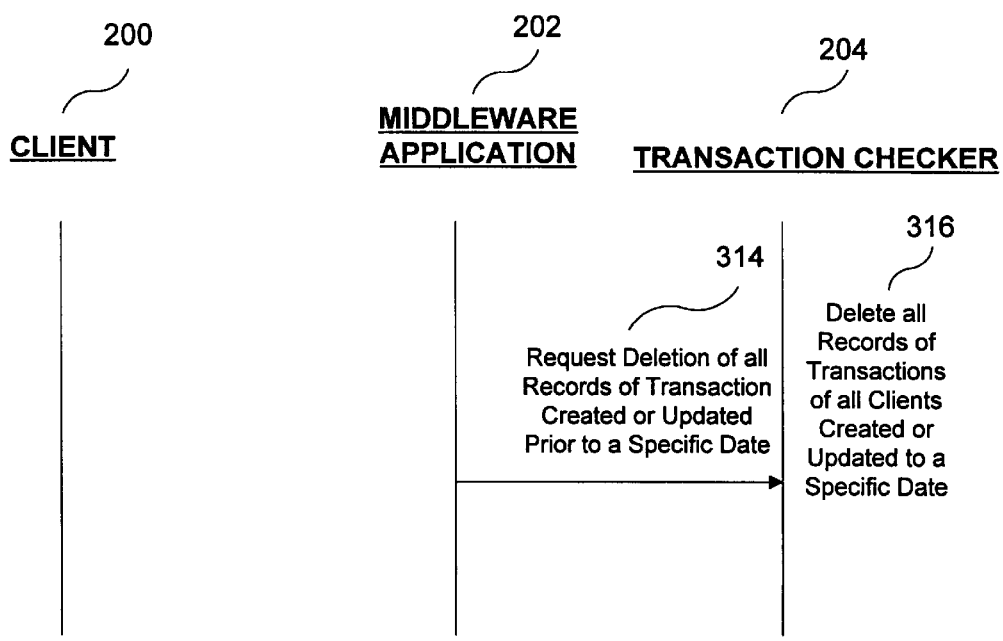
FIG. 3(b) is a diagram showing a method for deleting all records of a transaction created or updated prior to a specific date, as performed by the computer system of FIG. 1.

FIGS. 3(*a*) and 3(*b*) both show a method for deleting records of transactions on the Transaction checker database. FIG. 3(*a*) shows a method of deleting transaction objects from the Transaction checker database. In contrast, FIG. 3(*b*) shows a method of deleting at least one transaction record created or updated prior to a specific date.

As shown in FIG. 3(*a*), client 200 program or session, in step 306, terminates normally. In step 308, the client 200 sends a signal informing the middleware application 108 of the normal program or session termination. In step 310, the middleware application 202, requests that the Transaction checker 204 delete the record of the last committed transaction of the client 200. The transaction checker 204, in step 312, receives the request and deletes for that client 200 the record of the last committed transaction in the Transaction checker Database. In a preferred embodiment, the transaction checker 204 deletes the record of the last committed transaction by calling a database manager to delete the record from the database. The deleted transaction record includes the transaction objects including a user_ID, work_ID and time stamp showing when the transaction was committed.

As shown in FIG. 3(*b*), the middleware application 202, in step 314, requests deletion of all records of transactions created or updated prior to a specific date by at least one client. In response, the Transaction checker 204, in step 318, checks the time-stamps stored in its database and deletes all records of transactions of all clients created or updated prior to the specific date. In a preferred embodiment, the Transaction checker 204 deletes all records of the transactions by calling a database manager to delete these records from the database.

Although FIGS. 2, 3(*a*) and 3(*b*) show one client 200, other embodiments of the invention may include a plurality of clients in communication with a middleware application 202.

FIG. 4 shows an example format of the transaction checker database 112, 118 of FIG. 1. In a preferred embodiment, the transaction checker is a database server (e.g., a Tandem Pathway Server) that maintains information concerning transactions. The Transaction checker 200 processes the transactions as work objects that are used by the middleware application to provide transaction checking to their clients. As shown in FIG. 4, the Transaction checker 200 maintains a database of user_IDs 400, work_IDs 402 and time stamps (TS) 404. The database includes a record of the last committed transaction for each client. For example, the client identified as User_ID1 406 has a last committed transaction represented by Work_ID1 416 and TS1 426. User_ID2 408 has a last committed transaction represented by Work_ID2 418 and TS2 428. User_ID3 has a last committed transaction represented by Work_ID3 420 and a TS2 430. User_ID4 412 has a last committed transaction represented by Work_ID4 422 and a TS4 432. The user_IDs, work_IDs, and time-stamps shown in FIG. 4 are merely for purposes of illustration, and should not be construed as limiting the invention.

This application includes Appendix A, which describes the APIs and Host Computer Systems of several implementations of the present invention.

Several preferred embodiments of the present invention have been described. It will be understood that various modifications may be made without departing from the spirit and scope of the invention.

In describing the preferred embodiments, a number of specific technologies used to implement the embodiments of various aspects of the invention were identified and related to more general terms in which the invention was described. It should be understood, however, that such specificity is not intended to limit the scope of the claimed invention.

APPENDIX A

5. Example Implementations
5.1 Remote Server Call Implementation

This section describes a possible approach to adding the transaction checking feature to the RSC environment. It is provided to demonstrate the usability of the Transaction Checker. The actual RSC implementation will be described in an RSC External Specification.

New host attributes and workstation options are added to the RSC API to use the transaction checking feature. Transaction checking is requested at the TERM level. The client application uses new options to identify transactions and, in the case of failure, to retrieve transaction status.

A new TERM attribute, TRANSCHECK, is added to the RSC TERM object to request transaction checking for all transactions begun by the TERM being configured. The TRANSCHECK attribute can be set to the value YES or NO.

If YES is specified, the RSC TDP will invoke the Transaction Checker for all transactions. If NO is specified, the Transaction Checker will not be invoked. The default is NO.

Three new options are added to the RSC APL. The TRANSCHECK_USER_ID option holds the user ID assigned by RSC. The WORK_ID option is set by the client to identify a transaction. The HOST_WORK_ID option is set by the TDP to identify the last committed transaction.

5.1.1 Requesting Transaction Checking

RSC host system administrators request transaction checking by setting the TRANSCHECK attribute in the TERM object. If the TRANSCHECK attribute is specified for the TERM, the TDP automatically creates the environment that allows the client to track transactions. The TDP takes appropriate actions when the client begins a session and begins transactions. The client sets new options to monitor the status of transactions.

(An alternate method of requesting transaction checking for RSC is to provide new API function calls to enable and disable transaction checking. This method would replace the TRANSCHECK attribute in the TERM object. The advantage of this method is the flexibility to selectively check transactions. This can help performance and eliminate the need of the client program to always set the transaction checking options before executing RSCWriteRead function calls within a transaction. The disadvantage of this method is the addition of new API calls that must be included in the client code. The remainder of this section assumes RSC has chosen to implement the TRANSCHECK attribute in the TERM object.)

A new option, TRANSCHECK_USER_ID, is used to hold the user ID created by the TDP. When the RSC client issues the RscBeginSession API function call the TDP checks the value of the TRANSCHECK_USER_ID option. If it has a null value, the TDP creates a unique user ID for the client and sets the TRANSCHECK_USER_ID option to the user ID. The TDP can create the user ID from attributes such as the TDP name, the term name, the connection handle and the session handle. If the application includes an Access Control Server, the TDP can use the ACS UserId when creating the user ID. The client can reuse a user ID created in a previous session by setting the TRANSCHECK_USER_ID option to the previous user ID before issuing the RscBeginSession call.

After completion of the RscBeginSession call, the client can retrieve the user ID by issuing an RscGetOption API function call, specifying the TRANSCHECK_USER_ID option. The client should save the user ID in persistent storage in case it is needed to retrieve transaction information.

To use transaction checking, the client must assign a name to the transaction. To do this, the client sets the WORK_ID option to a string with a maximum length of TC_MAX_WORKID characters. The client should also save the work ID in persistent storage so it can be referenced in case of a failure.

The WORK_ID option must be set to a valid work identifier before issuing an RscWriteRead API function call within a transaction. If the TRANSCHECK attribute is specified for the TERM, the WORK_ID option must be set to a valid work identifier. If not, an error will be issued and the RscWriteRead will fail.

When the first RscWriteRead call in a transaction is issued, the TDP invokes the Transaction Checker if the TRANSCHECK attribute is set in the TERM object. The TCWorkCreate function is invoked to save the transaction. The Transaction Checker is called within the scope of the transaction begun by the client. If the transaction is successfully committed, a record of the transaction is saved by the Transaction Checker. If the transaction is not committed, it is not saved by the Transaction Checker.

Since calls to the Transaction Checker to create a work instance are included in the transaction stared by the client, a possibility exists that a failure to create the work instance will cause the transaction to fail. To notify the client that this has occurred, a new return value is added to the RscWriteRead function.

5.1.2 Retrieving the Last Transaction

After a failure in the client/server application, the RSC client can use an API function call to find the work ID of the last transaction committed. The client calls the RscGetOption API function, specifying the HOST_WORK_ID option. The last work ID committed for the client is returned. The client can compare the work ID returned to the work ID of the transaction started at the time of failure to determine if the transaction successfully completed. If the work IDs do not match, the client can restart the transaction.

It is possible that the application failure may force the client to begin a new RSC session. This situation can occur by rebooting the workstation. If the client wants to retrieve the work ID of the last transaction after beginning a new session, the client must set the TRANSCHECK_USER_ID option to the user ID saved from the failed session. The option must be set before calling the RscBeginSession API function. This prevents the TDP from assigning a new user ID and allows the retrieved work ID to be associated with the previous user ID.

5.1.3 Summary of Transaction Checking with RSC

Following is a summary of the steps taken in RSC to enable transaction checking:

Host system administrator sets the TRANSCHECK attribute to YES in the TERM object to request transaction checking.

When the client issues the RscBeginSession API function call, the TDP creates a unique user ID for the client and returns it in the TRANSCHECK_USER_ID option field.

Client retrieves the TRANSCHECK_USER_ID value by issuing an RscGetOption API function call. The value should be saved in persistent storage.

Client sets the WORK_ID option to a string identifying the transaction. The value of the WORK_ID option should be saved in persistent storage.

Client begins a transaction automatically using the RscWriteRead function call or explicitly using the RscBeginTransaction function call followed by one or more RSCWriteRead function calls.

The TDP invokes the TCWorkCreate function of the Transaction Checker for the first RscWriteRead function call.

The transaction is committed automatically using the RscWriteRead options or explicitly using the RscEndTransaction API function call.

If a failure occurs, the client can determine the last transaction committed by issuing the RscGetOption API function call.

The TDP invokes the TCWorkRetrieve function of the Transaction Checker and returns the work ID to the client in the HOST_WORK_ID option.

The client compares the work D returned to the work ID in question to determine whether the transaction successfully completed. If the work IDs do not match, the client can choose to restart the transaction.

5.1.4 RSC API Changes
5.1.4.1 RscWriteRead Changes
Return Value

| New return values are added: | Value: |
|---|---|
| RSC_TRANSACTION_CHECKING_FAILURE | to come |
| RSC_INVALID_TRANSCHECK_USER_ID | to come |
| RSC_INVALID_WORK_ID | to come |

5.1.4.2 TRANSCHECK Attribute

A new TERM attribute, TRANSCHECK, is added to the RSC TERM object to request transaction checking for all transactions begun by the TERM being configured.

TRANSCHECK: value YES or NO.

If YES is specified, the RSC TDP will invoke the Transaction Checker for all transactions. If NO is specified, the Transaction Checker will not be invoked. The default is NO. If TRANSCHECK is set to YES, the WORK_ID option must be set by the client before beginning a transaction.

5.1.4.3 TRANSCHECK_USER_ID Option

A new Option Definition is added: TRANSCHECK_USER_ID.
TRANSCHECK_USER_ID: Type CHAR *    TC_MAX_USERID characters A name that uniquely identifies the client application during a session. The name is assigned by the RSC TDP when a RscBeginSession API function call is executed if the TRANSCHECK TERM attribute is set to YES. This option is used by the TDP when a transaction is begun and when an RscGetOption API function call is executed with the HOST_USER_ID option.

The TRANSCHECK_USER_ID option can be set by the client when the client wishes to continue or retrieve a Work Id from a previously interrupted session. To ensure uniqueness, the TRANSCHECK_USER_ID should be the string returned from a previous RscBeginSession call.

5.1.4.4 WORK_ID Option

A new Option Definition is added: WORK_ID.
WORK_ID: Type CHAR *    TC_MAX_WORKID characters A name that identifies a transaction. WORK_ID must be set to a valid identifier by the client before beginning a transaction if the TRANSCHECK TERM attribute is set to YES. This option is used by the RscWriteRead API function.

5.1.4.5 HOST_WORK_ID Option

A new Option Definition is added: HOST_WORK_ID.
HOST_WORK_ID: Type CHAR *    TC_MAX_WORKID characters A name that is set by the TDP when an RscGetOption API function call is issued with this option specified. It is set to the value of the last Work ID committed for the user whose ID is in the TRANSCHECK_USER_ID option. It is set to NULL if there are no committed work IDs for the user. It is also set to NULL if the TRANSCHECK TERM attribute is set to NO.

5.2 NonStop Tuxedo Implementation

This section describes a possible approach to adding the transaction checking feature to the NonStop Tuxedo environment. It is provided to demonstrate the usability of the Transaction Checker. The actual NonStop Tuxedo implementation will be described in a NonStop Tuxedo External Specification.

Transaction checking is added to NonStop Tuxedo by providing four new function calls. Function calls are added to begin and end transaction checking and to set and retrieve work identifiers.

5.2.1 Requesting Transaction Checking

The NonStop Tuxedo client application requests transaction checking by calling the function TCBeginTransactionChecking. This function call causes the Work Station Handler to create a unique user ID for the client and return it to the client. The client should save the user ID in persistent storage in case it is needed to retrieve transaction information. The TCBeginTransactionChecking call can be executed at any time after a tpinit function has successfully completed. After completing this call the Work Station Handler invoke the Transaction Checker for all transactions started by the client application. Transaction checking is in effect until the client application calls the function TCEndTransactionChecking. Transaction checking can be started and stopped an unlimited number of times until the tpterm function is invoked.

To use transaction checking, the client must assign a name to the transaction. This is done by calling the function TCSetTransactionLabel and passing a string to identify the transaction. This call must be executed before a tpcommit call is issued to commit the transaction. The client should save the transaction label in persistent storage so it can be referenced in case of failure. When the tpcommit call is executed, the WSH invokes the TCWorkCreate function to save the transaction. The Transaction Checker is called within the scope of the transaction begun by the client. If the transaction is successfully committed, a record of the transaction is saved by the Transaction Checker. If the transaction is not committed, it is not be saved by the Transaction Checker.

Since calls to the Transaction Checker to create a work instance are included in the transaction started by the client, a possibility exists that a failure to create the work instance will cause the transaction to fail. To notify the client that this has occurred, a new error condition is defined and returned in tperrno.

5.2.2 Retrieving the Last Transaction

After a failure in the client/server application, the NonStop Tuxedo client can use a function call to find the transaction label of the last transaction committed. The client calls the TCGetTransactionLabel function, supplying the user ID assigned by NonStop Tuxedo. The transaction label of the last work ID committed for the client is returned. The client can compare the transaction label returned to the transaction label of the transaction stared at the time of failure to determine if the transaction successfully completed. If the transaction labels do not match, the client can restart the transaction.

It is possible that the application failure may force the client to rejoin the application. If the client application wants to retrieve the transaction label of the last transaction after rejoining the application, the client must pass the User ID saved from the failed session when it calls TCBeginTransactionChecking. This prevents the WSH from assigning a new user ID and allows the client to retrieve the transaction label associated with the original user ID.

5.2.3 Summary of Transaction Checking with NonStop Tuxedo

Following is a summary of the steps taken in NonStop Tuxedo to enable transaction checking:

Client issues the TCBeginTransactionChecking function call.

The WSH creates a unique user ID for the client and returns it to the client.

Client saves the user ID in persistent storage.

Client calls TCSetTransactionLabel to assign a work ID to the transaction.

Client performs tpbegin, one or more service calls, and tpcommit to execute a transaction.

The WSH invokes the TCWorkCreate function of the Transaction Checker before performing the tpcommit.

If a failure occurs, the client can determine the last transaction committed by issuing the TCGetTransactionLabel function call.

The WSH invokes the TCWorkRetrieve function of the Transaction Checker and returns the transaction label to the client.

The client compares the transaction label returned to the transaction label in question to determine whether the transaction successfully completed. If the transaction labels do not match, the client can choose to restart the transaction.

5.2.4 NonStop Tuxedo API Changes 5.2.4.1 TCBeginTransactionChecking char *TCBeginTransactionChecking (const char *UserID)

Initiates transaction checking for all transactions until TCEndTransactionChecking is called. Returns a User ID if the input parameter is NULL. If the input parameter is non-null, returns the input parameter. If this call is executed while transaction checking is in effect, this function does nothing.

The input parameter is supplied when the client wishes to continue a previously interrupted connection. To insure uniqueness, the user ID supplied as input should be the string returned from a previous TCBeginTransactionChecking function call.

5.2.4.2 TCEndTransactionChecking int TCEndTransactionChecking (const char *UserID)

Stops transaction checking. The UserID is the value returned from TCBeginTransactionChecking. Transaction labels associated with this UserID can be removed from the data base. Returns 0.

5.2.4.3 TCSetTransactionLabel int TCSetTransactionLabel (const char *UserID, const char *Label)

Assigns a label to a transaction. This label can be compared to the label returned by TCGetTransactionLabel to determine if a transaction was committed. The UserID is the value returned from TCBeginTransactionChecking. The Label is a value created by the client application. The Label has a maximum length of TC_MAX_WORKID characters. Returns 0.

5.2.4.4 TCGetTransactionLabel char *TCGetTransactionLabel (const char *UserID)

Returns the transaction label of the last committed transaction for the supplied UserID. The UserID is the value returned from TCBeginTransactionChecking. Returns NULL if there are no committed transactions for the supplied UserID.

We claim:

1. A method for providing a client computer system with state information of a current transaction to aid in a recovery of the client computer system from a system failure, the method comprising the following steps performed by a transaction checker server, of:

saving the current transaction to a database including a user ID, a work ID and a time-stamp;

maintaining, when the current transaction commits, a user ID, a work ID and a time-stamp, as a last committed transaction;

receiving a request to retrieve from the database the last committed transaction of the client computer system identified by the user ID; and returning the work ID of the last committed transaction that corresponds to the user ID.

2. The method as recited in claim 1, further comprising the step, performed by a transaction checker, of deleting the user ID, the work ID and the time-stamp of the current transaction upon receipt of a delete instruction.

3. The method as recited in claim 2, further comprising the steps, performed by the transaction checker, of:

receiving a request for deleting the user ID, the work ID and the time-stamp of the last committed transaction of the client computer system identified by the user ID; and deleting, responsive to the receiving step, the user ID, the work ID and the time-stamp of the last committed transaction of the user ID.

4. The method as recited in claim 1, further comprising the steps, performed by the client computer system, of:

sending a request to a middleware application for the transaction checker to perform transaction checking;

receiving and saving the user ID in response to the request sending step;

requesting a distributed computer processing system to execute the current transaction;

creating and saving the work ID that uniquely identifies the current transaction of the client computer system;

sending the user ID and the work ID of the current transaction to the middleware application;

sending a transaction commit instruction to the middleware application if the client commits the current transaction;

sending the user ID and a request for the work ID of the last committed transaction to the middleware application after a network failure;

receiving the work ID of the last committed transaction from the middleware application; and comparing the work ID of the current transaction to the work ID of the last committed transaction, wherein if the work ID of the current transaction equals the work ID of the last committed transaction then execution of the current transaction completed successfully and if the work ID of the current transaction does not equal the work ID of the last committed transaction then execution of the current transaction did not commit.

5. The method as recited in claim 1 further comprising the steps, performed by the middleware application, of:

receiving a request from the client computer system to save the current transaction of the client computer system;

sending the user ID and the work ID of the current transaction to the transaction checker;

invoking a transaction process to process the transaction;

receiving a transaction status from the transaction process and sending said transaction status to said client;

receiving a transaction commit instruction from the client if the client commits the current transaction, and sending the transaction commit instruction to the transaction process wherein the transaction process commits the current transaction and maintains the current transaction as the last committed transaction;

sending the user ID and a request for the work ID of the last committed transaction to the transaction checker application after a network failure; and returning to the client computer system the work ID of the last committed transaction that corresponds to the user ID.

6. The method as recited in claim 4 further comprising the step, performed by the client computer system, of:
requesting that the distributed processing system initiate execution of the current transaction if the comparing step determines that the current transaction did not commit.

7. An apparatus for providing a client computer system state information of a current transaction to aid in a recovery of the client computer system from a system failure, the apparatus comprising:
a first portion configured to send a request to a middleware application for the transaction checker to perform transaction checking;
a second portion configured to receive from the middleware application a user ID uniquely identifying the client computer system
a third portion configured to save the user ID;
a fourth portion configured to request a distributed computer processing system to execute the current transaction;
a fifth portion configured to create and save a work ID that uniquely identifies the current transaction of the client computer system;
a sixth portion configured to send the user ID and the work ID of the current transaction to the transaction checker;
a seventh portion configured to send a commit instruction to the middleware application from the client if the client commits the current transaction;
an eighth portion configured to send the user ID and a request for the work ID of the last committed transaction to the transaction checker;
a ninth portion configured to receive the work ID of the last committed transaction from the transaction checker; and
a tenth portion configured to compare the work ID of the current transaction to the work ID of the last committed transaction, wherein if the work ID of the current transaction equals the work ID of the last committed transaction then execution of the current transaction completed successfully, wherein if the work ID of the current transaction does not equal the work ID of the last committed transaction then execution of the current transaction did not commit.

8. The apparatus as recited in claim 7, wherein the sixth portion further comprises:
a portion configured to send the user ID and a work ID of the last committed transaction from the middleware application to the transaction checker; and
a portion configured to write the user ID representing the client computer system and the work ID representing the current transaction to a database.

9. The apparatus as recited in claim 7, wherein the seventh portion further comprises:
a portion configured to send the transaction commit instruction to the transaction process from the middleware application wherein the transaction process commits the current transaction and maintains the current transaction as the last committed transaction.

10. The apparatus as recited in claim 7, wherein the eighth portion further comprises:
a portion configured to send the user ID and a request for the work ID of the last committed transaction from the client computer system to the middleware application;
a portion configured to send the user ID and a request for the work ID of the last committed transaction from the middleware application to the transaction checker; and
a portion configured to retrieve from the database the last committed transaction of the client computer system.

11. The apparatus as recited in claim 7, wherein the ninth portion further comprises;
a portion configured to send the work ID of the last committed transaction that corresponds to the user ID from the transaction checker application to the middleware application; and
a portion configured to send the work ID of the last committed transaction from the middleware application to the client computer system.

12. The apparatus as recited in claim 7, further comprises:
a portion configured to send a request to the transaction checker to delete from the database the user ID, the work ID and the time-stamp of the last committed transaction of the client computer system; and
a portion configured to delete the user ID, the work ID and the time-stamp of the last committed transaction of the client computer system.

13. A computer program product comprising:.
a computer usable medium having computer readable code embodied therein for causing transaction checking to provide a client computer system state information of a current transaction to aid in a recovery of the client computer system from a system failure, the usable medium including:
a first computer readable program code device configured to cause a computer to effect sending a request to a middleware application for a transaction checker to perform transaction checking;
a second computer readable program code device configured to cause a computer to effect receiving from the middleware application a user ID uniquely identifying the client computer system;
a third computer readable program code device configured to cause a computer to effect saving the user ID;
a fourth computer readable program code device configured to cause a computer to effect requesting a distributed computer processing system to execute the current transaction;
a fifth computer readable program code device configured to cause a computer to effect creating and saving a work ID that uniquely identifies the current transaction of the client computer system;
a sixth computer readable program code device configured to cause a computer to effect sending the user ID and the work ID of the current transaction to the transaction checker;
a seventh computer readable program code device configured to cause a computer to effect sending a commit instruction to the middleware application from the client if the client commits the current transaction;
an eighth computer readable program code device configured to cause a computer to effect sending the user ID and a request for the work ID of the last committed transaction to the transaction checker;
a ninth computer readable program code device configured to cause a computer to effect receiving the work ID of the last committed transaction from the transaction checker; and
a tenth computer readable program code device configured to cause a computer to effect comparing the work ID of the current transaction to the work ID of the last committed transaction, wherein if the work ID of the current transaction equals the work ID of the last committed transaction then execution of the current transaction completed successfully, wherein if the work ID of the current transaction does not equal the work ID of the last committed transaction then execution of the current transaction did not commit.

14. The computer program product as recited in claim 13, wherein the sixth computer readable program code device further comprises:

a computer readable program code device configured to cause a computer to effect sending the user ID and a request for the work ID of the last committed transaction from the middleware application to the transaction checker;

a computer readable program code device configured to cause a computer to effect writing the user ID representing the client computer system and the word ID representing the current transaction to a database; and a computer readable program code device configured to cause a computer to effect maintaining the user ID and the work ID as a last committed transaction when the transaction commits and to effect writing to the database a time-stamp of the time of the transaction commit.

15. The computer program product as recited in claim 13, wherein the seventh computer readable program code device further comprises:

a computer readable program code device configured to cause a computer to effect sending the transaction commit instruction to the transaction process from the middleware application wherein the transaction process commits the current transaction and maintains the current transaction as the last committed transaction.

16. The computer program product as recited in claim 13, wherein the eighth computer readable program code device further comprises:

a computer readable program code device configured to cause a computer to effect sending the user ID and a request for the work ID of the last committed transaction from the client computer system to the middleware application;

a computer readable program code device configured to cause a computer to effect sending the user ID and a request for the work ID of the last committed transaction from the middleware application to the transaction checker; and a computer readable program code device configured to cause a computer to effect retrieving from the database the last committed transaction of the client computer system.

17. The computer program product as recited in claim 13, wherein the ninth computer readable program code device further comprises:

a computer readable program code device configured to cause a computer to effect sending the work ID of the last committed transaction that corresponds to the user ID from the transaction checker application to the middleware application; and a computer readable program code device configured to cause a computer to effect sending the work ID of the last committed transaction from the middleware application to the client computer system.

18. The computer program product as recited in claim 13, further comprises:

a computer readable program code device configured to cause a computer to effect sending a request to the transaction checker to delete from the database the user ID, the work ID and the time-stamp of the last committed transaction of the client computer system; and a computer readable program code device configured to cause a computer to effect deleting the user ID, the work ID and the time-stamp of the last committed transaction of the client computer system.

* * * * *